(12) United States Patent
Snyder et al.

(10) Patent No.: US 8,656,091 B2
(45) Date of Patent: Feb. 18, 2014

(54) DATA STORAGE IN NONVOLATILE MEMORY

(75) Inventors: Adam J Snyder, Bend, OR (US); David G Butler, Eagle, ID (US); Kenneth Kay Smith, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 13/190,122

(22) Filed: Jul. 25, 2011

(65) Prior Publication Data

US 2013/0031304 A1   Jan. 31, 2013

(51) Int. Cl.
    *G06F 13/10*   (2006.01)
(52) U.S. Cl.
    USPC .......................................................... 711/103
(58) Field of Classification Search
    None
    See application file for complete search history.

(56) References Cited

U.S. PATENT DOCUMENTS

| | | |
|---|---|---|
| 7,802,129 B2 | 9/2010 | Slyz et al. |
| 2008/0320263 A1 | 12/2008 | Nemiroff et al. |
| 2009/0024899 A1 | 1/2009 | Reid |
| 2009/0228656 A1* | 9/2009 | Borkenhagen ............... 711/118 |
| 2009/0228668 A1 | 9/2009 | Borkenhagen |
| 2010/0023682 A1 | 1/2010 | Lee et al. |
| 2010/0257345 A1* | 10/2010 | Tazzari et al. ................... 713/1 |
| 2010/0274773 A1 | 10/2010 | Pawar et al. |
| 2010/0325523 A1 | 12/2010 | Slyz et al. |

* cited by examiner

*Primary Examiner* — Duc Doan (57) ABSTRACT

A method for data storage in a nonvolatile memory device includes compressing current data. The compressed current data is written to a space of the nonvolatile memory device that does not include a most recently written data. If the compressed current data is successfully written, identification data is stored on the nonvolatile memory device. The identification data identifies the written compressed current data as a currently valid version.

19 Claims, 7 Drawing Sheets

DATA STORAGE IN NONVOLATILE MEMORY

BACKGROUND

Nonvolatile data storage, and in particular data storage electrically addressed nonvolatile memory devices, is a key component in many consumer devices. For example, nonvolatile data storage is used in some high-end calculators to store the variable stack and programs. Personal computer (PC) motherboards may use nonvolatile data storage to store the basic input/output system (BIOS). Cellular telephones may use nonvolatile data storage to store such data as telephone numbers and address books. All-in-one printers or other printers may use nonvolatile data storage to store data such as page counts or passwords.

Access to nonvolatile data storage devices may be slower compared to other types of data storage devices. This is true of flash memory, and even more so of other types of electrically erasable programmable read-only memory (EEPROM).

Nonvolatile storage devices (e.g. flash memory, EEPROM, battery-backed random access memory) tend to be relatively expensive components of the devices into which they are incorporated. The cost of the nonvolatile storage device often increases as the storage capacity of the device increases. Therefore, cost considerations may dictate incorporating as small (in terms of storage capacity) a nonvolatile storage device as is practical.

Some nonvolatile data storage devices are limited during their useful lifetime to a limited number of write operations. Exceeding this limit may cause the nonvolatile data storage device to operate non-reliably.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

DETAILED DESCRIPTION

Data storage in a nonvolatile memory (NVM) device, in accordance with an embodiment of the invention, includes compressing current data prior to storing the current data on the NVM device. The compressed data is written to the NVM device in such a manner so as to ensure that a valid set of data is available, whether or not the compressed data is written successfully. In accordance with an embodiment of the present invention, a most recently written set of compressed data is stored on the NVM device at least until new data is written to the NVM device.

The NVM device is typically a component of, or in communication with (e.g. is insertable into or connectable to) a host device.

Figure 1:
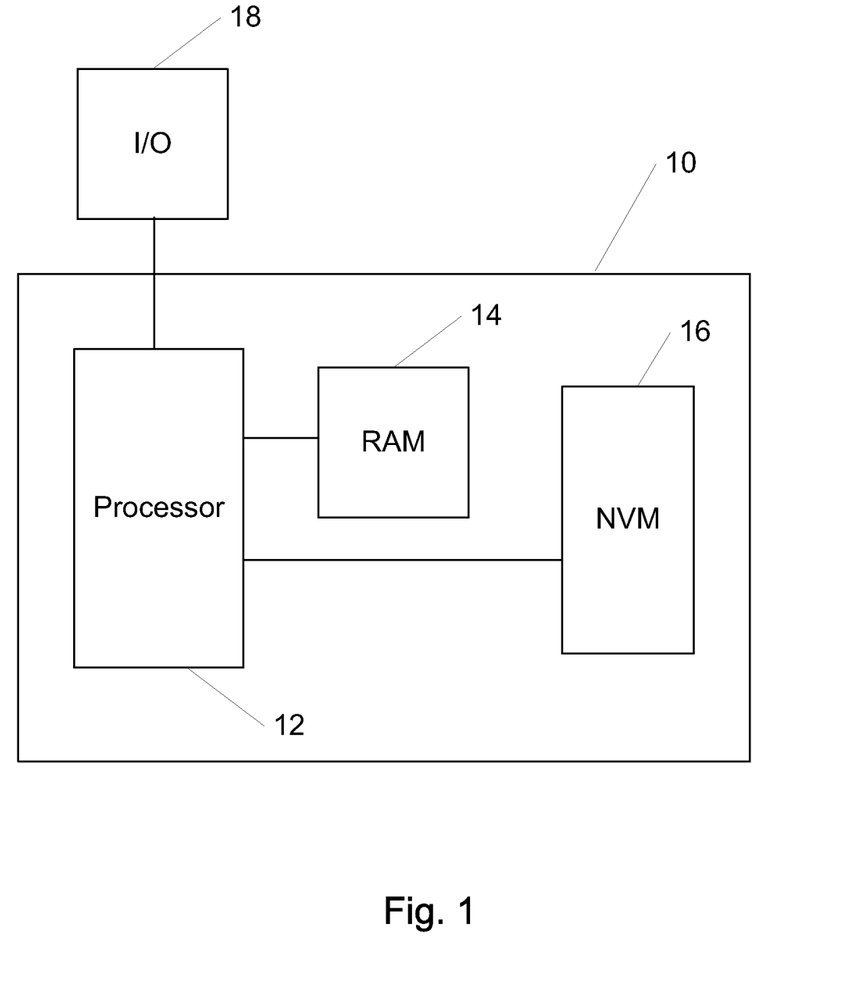
FIG. 1 is a schematic diagram of a system that incorporates a nonvolatile memory (NVM) device for data storage in accordance with an embodiment of the invention.

FIG. 1 is a schematic diagram of a system that incorporates an NVM device for data storage in accordance with an embodiment of the invention.

Host device 10 represents a system or device, such as a consumer device, that includes (to be understood as including connectable to) NVM device 16. A typical host device 10 may communicate with an input or output device, such as input/output device 18. Input/output device 18 may be understood as representing input and output devices for communicating with a human operator. Input/output device 18 may be also understood as including any component or external device with which host device 10 communicates, and transmits instructions to or receives instructions from (including, e.g., any additional volatile or nonvolatile data storage devices in addition to NVM device 16, or an interface for communication with a network or one or more external devices), or a port for enabling communication with an external device. For example, host device 10 and input/output device 18 may represent a calculator or cellular telephone with keypad and display, a PC motherboard and peripheral equipment, or a printer with printing heads (or an all-in-one printer with printing heads and scanners). Host device 10 may also include, for example, a tablet computer, an e-reader, or a networking device such as a router or switch.

Host device 10 includes processor 12. Processor 12 may operate in accordance with machine readable instructions. For example, machine readable instructions for operation of processor 12 may be stored on NVM device 16, or on another NVM device with which processor 12 may communicate via input/output device 18.

For example, processor 12 may control operation of, or communicate with, input/output device 18 in accordance with input that is received via input/output device 18. During operation of processor 12, processor 12 may store data to, or read data from, random access memory RAM 14. RAM 14 is volatile such that when electric power supply to RAM 14 is interrupted, data that was stored to RAM 14 is lost.

Processor 12 may be configured to identify from among the data stored on RAM 14 any data (hereinafter referred to as persistent data) that may be required or useful for future use of host device 10. Such persistent data may include, for example, programming instructions, a BIOS, telephone or address books, total cumulative page counts, or passwords. Processor 12 may be configured to store, in response to predetermined conditions, such persistent data on NVM device 16. Processor 12 may be further configured to read, in response to a different set of predetermined conditions, the stored persistent data from NVM device 16 and store the read data to one or more volatile memory devices that may serve as a working memory for processor 12 (any such device or collection of devices being hereinafter referred to as random access memory, or RAM), here being represented by RAM 14. For example, processor 12 may be configured to store persistent data on NVM device 16 when the data has changed. Processor 12 may be configured to read data from NVM device 16 when host device 10 is started up.

Data may be stored on are NVM device 16, in accordance with an embodiment of the invention, in compressed form. The current data may include updated data that is related to host device 10, which incorporates or communicates with NVM device 16. The current data may be stored on NVM device 16 so that the current data is available for utilization by host device 10 at a later time (such as after powering host device 10 off and powering on).

For example, at the later time, the stored current data may be read, decompressed, and loaded in a volatile memory device, such as RAM 14, that serves as working memory. Processor 12 of host device 10 may utilize data that is loaded into RAM 14 during its operation.

Data compression (e.g. by a factor of more than one) may enable storing a larger amount of data on a NVM device 16 than would be possible without data compression. In some cases, such data compression may enable selecting an NVM device 16 with less data storage capacity (and thus less expensive) than would be possible without applying data compression. Thus, a minimally sized NVM device 16 may be incorporated in (to be understood as including communicating with) host device 10. Incorporating a minimally sized NVM device 16 in host device 10 may enable minimizing a cost of producing NVM device 16 or host device 10.

Compressed data may typically be written to the NVM device 16 in larger blocks than are typical for stored uncompressed data. Thus, the possibility of corruption or interruption of the written data may be greater with compressed data than with uncompressed data. In the event of an occurrence of corruption or interruption during writing of the compressed data, the newly written data may be completely or partially unusable. Therefore, in accordance with an embodiment of the invention, storage of the data is such as to always ensure the existence of a valid and accessible set of data that is stored on NVM device 16 (once an initial set of data has been stored).

At the time that the compressed current data is stored, NVM device 16 may include one or more previously stored sets of data. For example, the current data may represent an updated version of previously stored data. Thus, the current data that is being stored may be intended to be used by the host device 10 in place of the previously stored data. One of the previously stored sets of data may be a most recently written data. The most recently mitten data includes the set of the previously stored sets of data that was successfully stored most recently on NVM device 16.

The current data as compressed may be written to a data storage space on NVM device 16 that does not include (e.g. does not fully or partially overlap) a data storage space that includes the most recently written data. Thus, the most recently written data remains intact and accessible after the compressed current data is written to NVM device 16.

If the compressed current data has been successfully written to NVM device 16, identification data may be stored on NVM device 16 that identifies the written compressed current data as a currently valid version of the data. Thus, when host device 10 accesses the stored data on NVM device 16, host device 10 may utilize the identification data to access the stored current data. For example, a header stored on NVM device 16 (e.g. in the form of an NVM or volume header) may include a field that identifies an address of a data block of the NVM that includes the stored compressed current data.

For example, writing the compressed current data to NVM device 16 may include calculation of a checksum. A checksum field (or series of checksum fields) that is stored on NVM device 16 (e.g. as part of the volume header) may be initially set to zero (e.g. when NVM device 16 is configured or formatted, or at the beginning of a write operation). When the compressed current data is successfully written to NVM device 16, a value of the checksum may be calculated that is non-zero. The non-zero checksum may then be written to the corresponding checksum field. The presence of a non-zero checksum in the corresponding checksum field may be indicative of successful writing of the compressed current data to NVM device 16. Thus, upon detection of the presence of the non-zero checksum field, identification data may be updated (from a previous value that identified the most recently written data as the currently valid version of the data) to identify the written compressed current data as the currently valid version of the data. The currently valid version of the data may include data that is to be loaded into RAM 14 for utilization by processor 12 of host device 10.

It may occur that the compressed current data is not successfully written. For example, a supply of power to host device 10 or to NVM device 16 may have failed during the writing operation. The occurrence of an unsuccessful writing operation may be indicated by a value of zero in the checksum field. Alternatively, occurrence of an unsuccessful writing operation may be indicated by a checksum that is inconsistent with the written compressed current data.

When an unsuccessful writing operation is indicated, the identification data may not be updated (which would have incorrectly identified the possibly inaccessible unsuccessfully written compressed current data as the currently valid data). Rather the identification data may continue to identify the most recently written data as the currently valid version of the data. Therefore, host device 10 may continue to access the most recently written data. Identification of the most recently written data as the currently valid version of the data may continue until the current data is successfully written to NVM device 16. Thus, until the current data is successfully written, whenever data is loaded from NVM device 16 to RAM 14, the most recently written data is loaded.

In accordance with an embodiment of the invention, frequently updated data may be stored in uncompressed form, e.g. in a separate block of NVM device 16. For example, prior to storing data, processor 12 of host device 10 may identify some data that is updated more frequently than other data (or frequently updated as determined in accordance with predetermined criteria). The identified frequently updated data may be stored separately from the remainder of the data. By storing the frequently updated data in uncompressed form and separately (e.g. in a separate block of storage space of NVM device 16), updating a version of the frequently updated data may not entail recompressing all of the data and writing the recompressed data to NVM device 16.

Typically, the frequently updated data may represent a relatively small fraction of all of the data that is stored on NVM device 16. Therefore, by storing the frequently updated data separately, the total (cumulative) amount of data that is written to NVM device 16 may be reduced. Reducing the total amount of data that is written to the NVM device 16 may contribute to extending the useful life of the NVM device 16.

Figure 2:
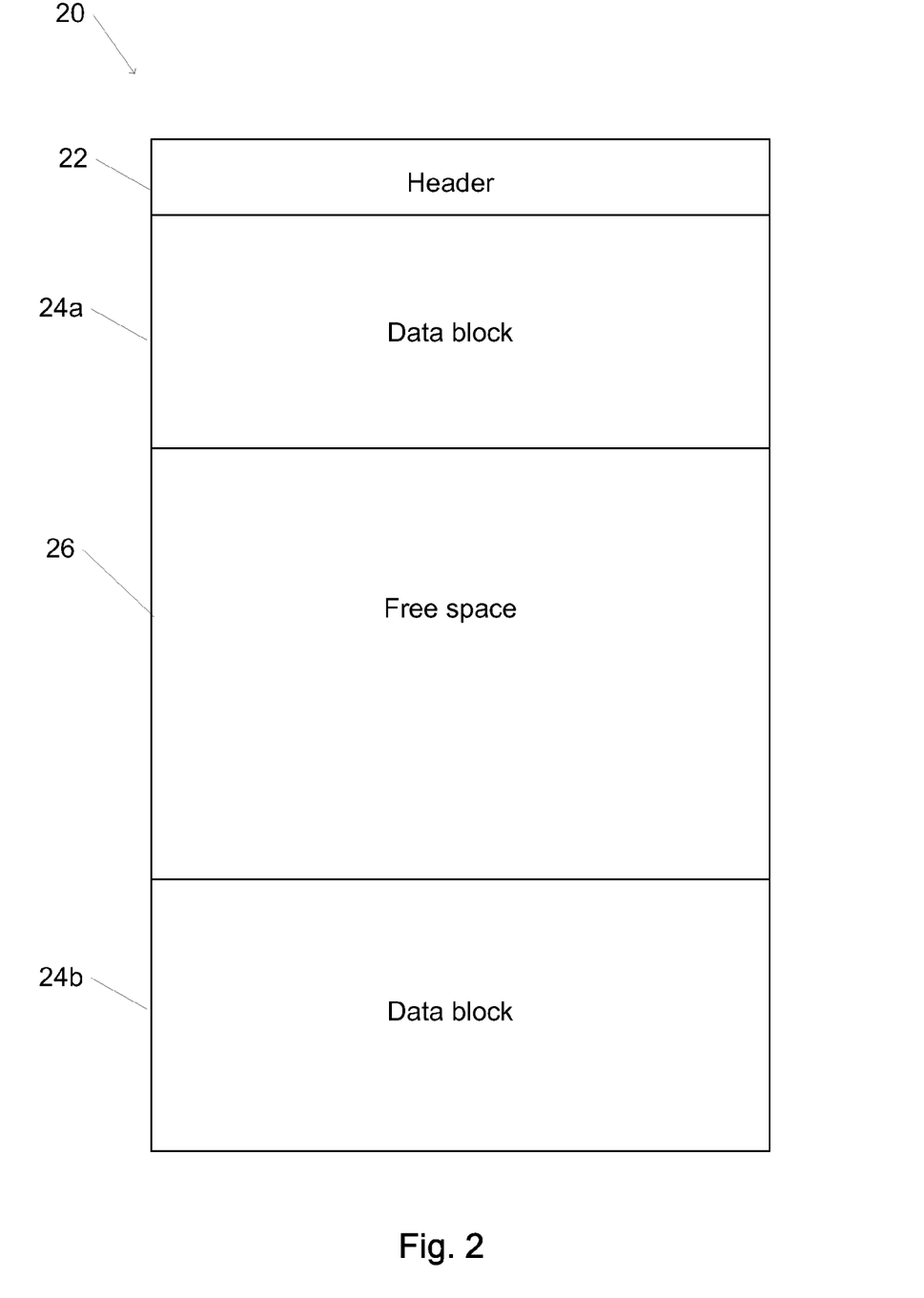
FIG. 2 is a schematic diagram of organization of data storage space within an NVM device in accordance with an embodiment of the invention.

FIG. 2 is a schematic diagram of organization of data storage space within an NVM device in accordance with an embodiment of the invention.

NVM data storage space 20 may reside on an NVM device, such as NVM device 16 (FIG. 1). NVM data storage space 20 may be partitioned into one or more NVM subspaces. A NVM subspace is a portion of NVM data storage space 20 that is designated for storing a set of data (the data may or may not be interrelated). The partitioning of NVM data storage space 20 into specific NVM subspaces may not be permanent in all cases. For example, at a later time, when another set of data is to be stored, NVM data storage space 20 may be repartitioned into a different arrangement of NVM subspaces.

For example, an NVM subspace may be designated for storage of blocks of data that were written to the NVM device 16.

For convenience, as shown in the Figures (e.g. FIG. 2), data blocks are illustrated schematically as occupying a contiguous portion of NVM data storage space 20. However, a data block need not be stored in a contiguous manner. For example, data of a data block may be stored in two or more non-contiguous regions of NVM data storage space 20. A technique, such as chaining (using a linked list) or a scatter-gather type of list, may be applied so as to associate the various non-contiguous sections of a data block with one another.

Typically, at least one NVM subspace of NVM storage space 20 is designated to serve as a volume header, such as NVM header 22. NVM header 22 may include data that enables identifying other data that is stored in NVM data storage space 20. For example, NVM header 22 may reside at fixed and known address of NVM data storage space 20. Thus, a processor or other device may be programmed to read data from NVM header 22 by reading data from that address.

For example, a processor may be configured to read and utilize data that is stored in a data block of NVM data storage space 20. NVM header 22 may typically be configured to store data that, when read by a processor (or similar device), may enable the processor to locate, and read data from, that data block. For example, data that is stored in NVM header 22 may be arranged in a predetermined manner as a series of header items, or fields. The following describes an example of header fields in accordance with an embodiment of the invention. It should be understood that one or more alternative sets of header fields may equally enable a processor to locate and read data blocks of NVM data storage space 20.

For example, one field of NVM header 22 may include a current revision number. The current revision number may identify a data block that contains the currently valid data. Thus, as described above, the current revision number field of NVM header 22 may be updated after a successful write of current data to NVM data storage space 20. In another embodiment of the invention, a data block that contains the currently valid data may be identified by a different value (e.g. a start address size of the data block).

Another field of NVM header 22 may indicate a count or number of data blocks that may be described in the following descriptor fields of NVM header 22. For example, in accordance with one embodiment of the invention, such a number may represent a maximum number of data blocks on NVM data storage space 20 that is possible in accordance with currently available storage space and compression ratio. In accordance with another embodiment of the invention, a maximum number of concurrently existing data blocks, or a maximum total number of data blocks created, may be determined at design or development time. In this case, the maximum number of blocks may be coded as a programming instruction, rather than included as a field of NVM header 22. In accordance with another embodiment of the invention, NVM header 22 may always include descriptors of a fixed limited number of data blocks (e.g. a data block containing currently valid data and a data block containing most recently written data).

NVM header 22 may include a series of descriptors. Each descriptor includes data that defines an associated data block of NVM data storage space 20. Each descriptor may include a fixed number of descriptor fields. For example, a descriptor field may include a revision number of the associated block. Thus, a data block whose associated revision number descriptor field matches a current revision number value in a current revision number field of NVM header 22 may be identified as containing currently valid data.

Another descriptor field may include a pointer to the data block that is associated with the descriptor. For example, an offset descriptor field may include an offset number (e.g. number of addresses from a beginning of NVM header 22) that points to the beginning of the associated data block. Another descriptor field may then, for example, contain a size of the associated data block (e.g. in bytes). In accordance with another embodiment of the invention (e.g. if all data blocks are contiguous), an offset of an end of the data block may be indicated by a descriptor field.

In accordance with an embodiment of the invention, more than one compression method may be applied when compressing data. In this case, a compression method descriptor field may designate a compression method that was used to compress data that is stored in the associated data block of NVM data storage space 20. Knowledge of the compression method may facilitate or enable decompressing the data for use by a processor or for loading into RAM. For example, each available compression method may be designated by a number or code. As another example, the compression method descriptor field (or fields) may contain a value of one or more parameters that enable identification of a compression method.

A descriptor may include a checksum field, typically the last descriptor field that is written. The checksum field may contain a checksum that is calculated on the basis of the compressed data that is written to the associated data block of NVM data storage space 20. For example, a checksum may be calculated by adding all bytes of compressed data that are written to the associated data block. Under predetermined conditions (e.g. when initializing or formatting NVM data storage space 20, or at the beginning of a write operation to the associated data block), the checksum field may be initialized to a value that is not typical of a block of successfully written data (e.g. zero). Thus, successful writing of compressed data to the associated data block may be indicated by a value in the checksum descriptor field that is different from the initial value (and that is consistent with the data that is contained in the associated data block).

As shown in FIG. 2, compressed data has been written to two data blocks. For example, a first set of data may have been written to data block 24a. A second set of data (e.g. a currently valid data, also at this point a most recently written data) may have been written to data block 24b. An appropriate field of NVM header 22 may thus indicate that currently valid data is stored in compressed form in data block 24b. For example, block 24b may be associated with a revision number, e.g. 2. In this case, a value of a current revision number field of NVM header 22 (also 2 in this example) may indicate data block 24b as storing the currently valid data.

Data block 24b may have been written to NVM data storage space 20 at a location of NVM data storage space 20 that is not contiguous with, or adjacent to, data block 24a. For example, such a location of data block 24b may enable overwriting either of data block 24a or data block 24b at a later time, without having to overwrite the other.

In the situation that is shown in FIG. 2, no data (or no readable data) is contained in free space 26. Thus, if a current data is compressible to a volume that is no larger than free space 26, the current data may be compressed and written to a data block to be defined within free space 26.

Figure 3:
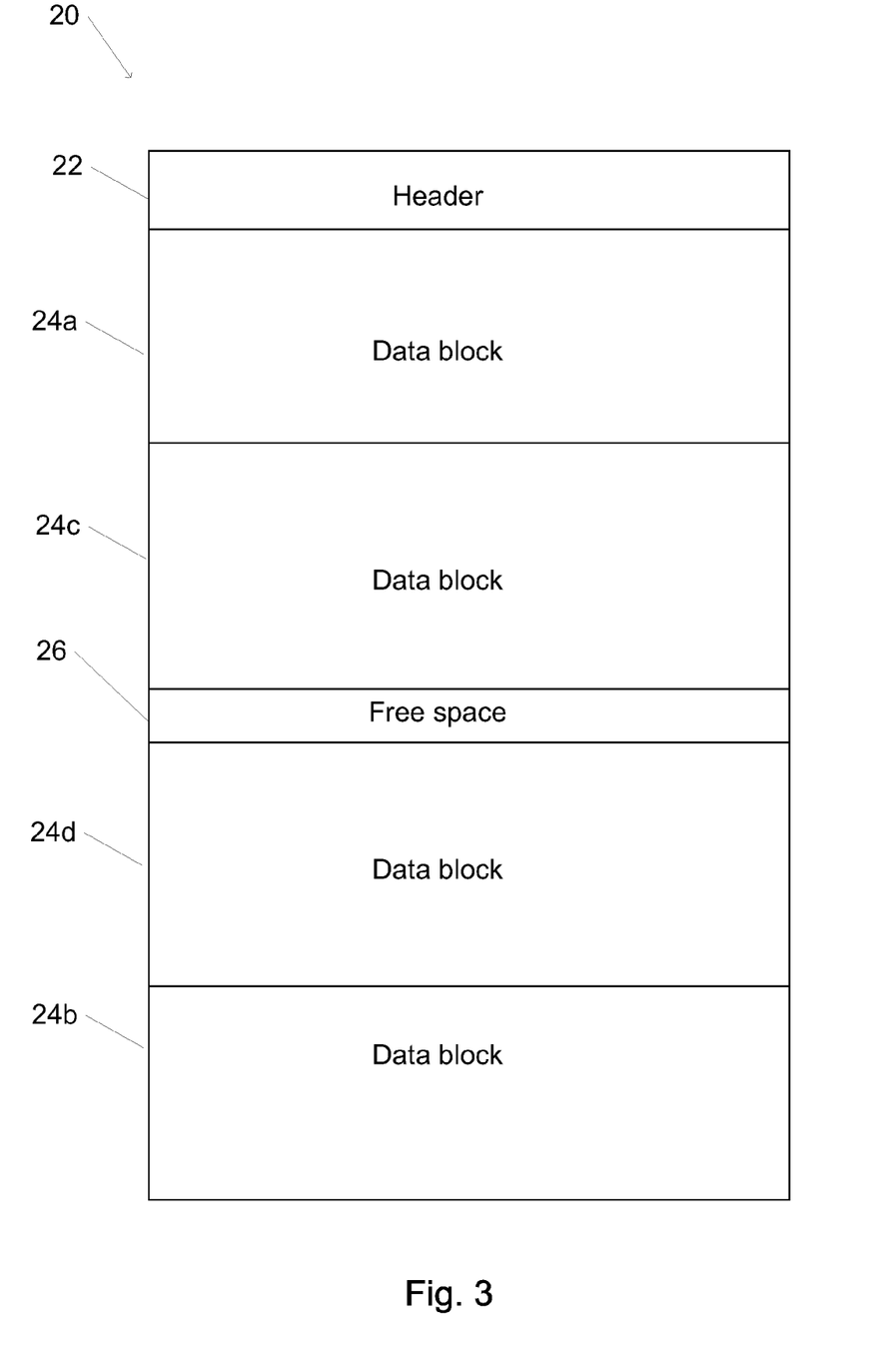
FIG. 3 is a schematic diagram of organization of the data storage space shown in FIG. 2, with additional data blocks.

After the current data is compressed, an attempt may be made to write the compressed current data to a space within free space 26, e.g. to data block 24*c* (FIG. 3). The space may be associated with an incremented revision number (e.g. 3). If the write operation fails, the data that was written to the space may be incomplete or corrupted. The failure may be detected, e.g. when calculating a checksum or attempting to write a checksum to NVM header 22. In this case, a value that indicates the location of the stored currently valid data, e.g. a current revision number field of NVM header 22, remains with its previous value (that indicates that the currently valid data is stored in data block 24*b*).

FIG. 3 is a schematic diagram of organization of the data storage space shown in FIG. 2, with additional data blocks.

The organization of NVM data storage space 20 as illustrated in FIG. 3 may represent NVM data storage space 20 at a time after the organization shown in FIG. 2. For example, the current data may have been updated after the compressed data was stored in data block 24*b*. The updated data was then compressed and saved in data block 24*c*. The data may have been further updated at a later time. The further updated data may then have been saved in data block 24*d*. Thus, the data in data block 24*d* may represent a currently valid data (and a most recently written data). An appropriate field of NVM header 22 may thus be updated to indicate that currently valid data is stored in compressed form in data block 24*d*.

Typically, compressed data may be written to NVM data storage space 20 in a manner that utilizes NVM data storage space 20 in an efficient manner. However, free space 26, as shown in FIG. 3, may be too small to enable storage of compressed current data. Thus, if the current data is updated and is to be stored, one or more data blocks of NVM data storage space 20 to which previous versions of the data had been written would be overwritten.

In accordance with an embodiment of the invention, a data block that contains the most recently written data may not be overwritten. In accordance with an embodiment of the invention, a data block to which data was written at an earlier time may be overwritten prior to a data block to which data was written at a later time.

Figure 4:
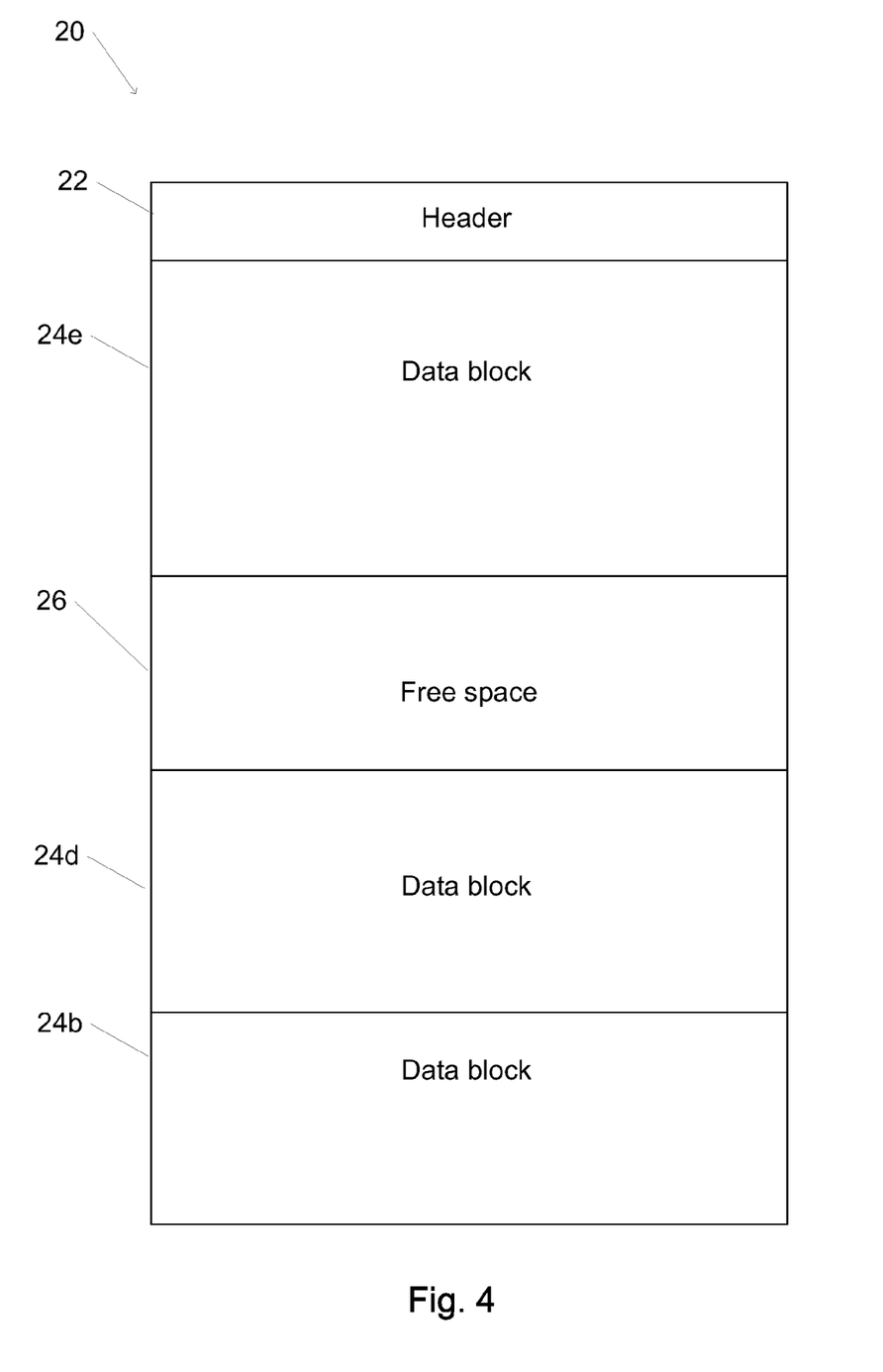
FIG. 4 is a schematic diagram of organization of the data storage space shown in FIG. 4, with an additional data block that overwrites previously written data blocks.

FIG. 4 is a schematic diagram of organization of the data storage space shown in FIG. 4, with an additional data block that overwrites previously written data blocks.

The organization of NVM data storage space 20 as illustrated in FIG. 4 may represent. NVM data storage space at a time after the organization shown in FIG. 3. For example, the current data may have been updated after the compressed data was stored in data block 24*d*. The updated data was then compressed and saved in data block 24*e*.

Data block 24*e* is located on NVM data storage space 20 such as to overwrite previously written data blocks 24*a* and 24*c* (FIG. 3). For example, the amount of compressed data that was written to data block 24*e* may have been greater than the amount that had been previously written to data block 24*a*. However, when data was written to data block 24*e*, care may have been taken not to overwrite the location to which the most recently written data had been written, e.g. data block 24*d*. Thus, had a failure occurred in writing compressed data to data block 24*e*, data that, had been stored in data block 24*d* would have remained intact.

Figure 5:
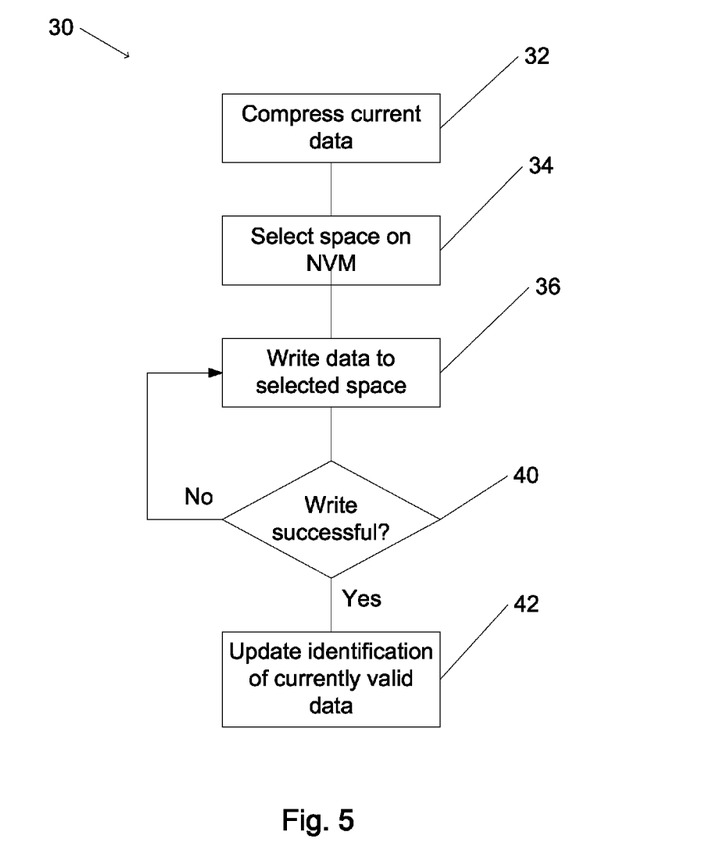
FIG. 5 is a flowchart illustrating a method for storing data to an NVM, in accordance with an embodiment of the invention.

FIG. 5 is a flowchart illustrating a method for storing data to an NVM, in accordance with an embodiment of the invention.

It should be understood that with regard to this flowchart and all other flowcharts of this description that the illustrated division of the method into discrete steps is for convenience only, and alternative division of the method into discrete steps is possible with equivalent results. All such alternative division into discrete steps should be understood as being included within embodiments of the invention. It should further be understood with regard to this and all other flowcharts, that, unless stated otherwise, the order of the step has been selected for convenience only. Steps of the method may be performed in another order or concurrently with equivalent results. All such reordering of the steps should be understood as included within the scope of embodiments of the invention.

NVM data storage method 30 may be executed by a processor that is associated with a host device (e.g. a calculator, PC motherboard, cellular telephone, printer, or all-in-one printer). For example, NVM data storage method 30 may be executed when the processor, during the course of its operation, updates data that is to be stored in a nonvolatile manner for access after, e.g. powering down and then powering up. For example, such data may include programming instructions or data that is to be accessed by a program or by a user of the host device. Updating data and updated data should be understood in a broad sense that includes newly defining data and newly defined data.

NVM data storage method 30 may be executed immediately upon updating data, or under additional predetermined conditions. For example, such predetermined conditions may include a quantity (e.g. number of variables or number of bytes) of updated values, an action (e.g. as part of an orderly power-off procedure), or after a predetermined period of time.

The updated data (which may include previous data that was not updated) is to be stored on an NVM device that is associated with the host device. The data to be saved may then be compressed (step 32). Typically, the compressed data is to be written to the NVM device in the form of a single (contiguous or non-contiguous) compressed data block.

A storage space on the NVM device to which the compressed updated data is to be written, and that is sufficiently large to accommodate the compressed updated data, may be selected (step 34). Selection of the space may include selecting a space that does not partially or completely overlap a space to which a most recently written data was written. Selection of the space may such as to contribute to efficient utilization of the storage space that is available on the NVM device. For example, the selection of the space may include preferentially selecting space that is not located next to or near the space to which the most recently written data had been written.

The compressed updated data may then be written to the selected space (step 36). Beginning to write the compressed updated data may be accompanied by one or more actions for the purpose of enabling detection of unsuccessfully written data. For example, a checksum field that is associated with the selected space may be initialized (if it had not been initialized previously), e.g. to zero. During writing, a checksum value may be calculated. As another example, a power supply to the host device or to the NVM device may be monitored so as to detect any interruption in the supply of power.

When the write operation is complete, one or more indicators may be utilized so as to determine whether the write operation was successful (step 40). For example, at the end of the write operation, a checksum may be calculated and written to a previously initialized checksum field. Thus, failure to complete the write operation may be indicated by the presence of the initialized value (e.g. zero) in the checksum field. As another example, data that is written at the selected space may be checked for consistency with a checksum that was calculated during the course of the write operation.

If the compressed updated data was not written successfully to the selected space, the write operation may be repeated (returning to step 36).

If the compressed updated data was written successfully to the selected space, an identification of a selected space as containing currently valid data may be updated (to be understood as including being written for the first time) (step 42). For example, a current revision number field of an NVM header (or another data field that may be read in order to identify the selected space as including the currently valid data) may be updated so as to identify a revision number that is associated with the selected space as a current revision number.

When data is to be accessed, current revision number field, or similar data field, may be read. One or more values that are read from the data field may identify the selected space as containing currently valid data. The data may be accessed by reading the data in the identified selected space and by decompressing the read data.

In accordance with an embodiment of the invention, some or all of updated data may be identified as frequently updated data. The frequently updated data may be stored separately from other data in uncompressed form. For example, data storage space of an NVM may include an NVM subspace that is designated for storage of uncompressed frequently updated data.

Figure 6:
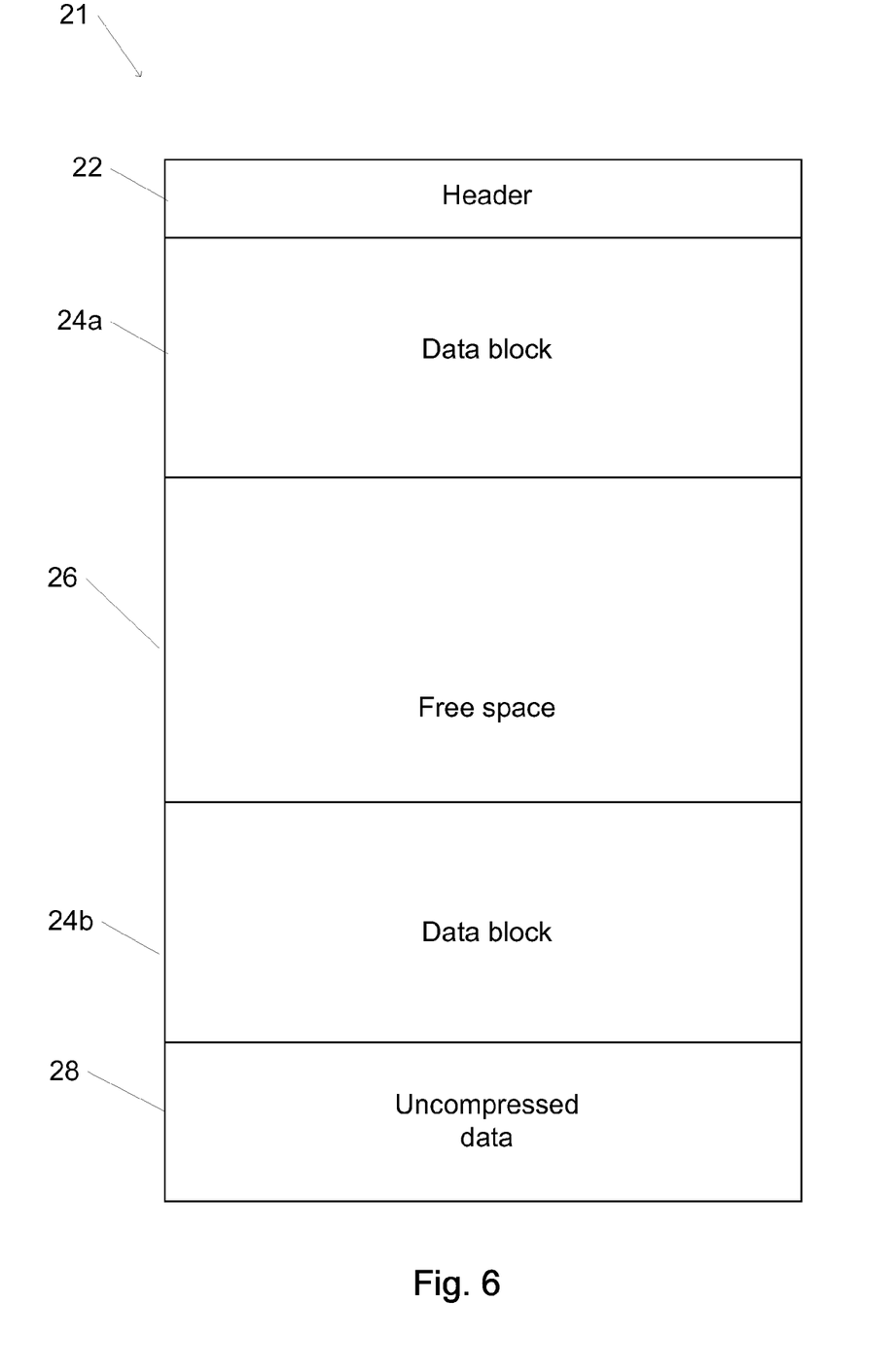
FIG. 6 is a schematic diagram of an organization of data storage space within an NVM device partitioned for separate storage of frequently updated data, in accordance with an embodiment of the invention.

FIG. 6 is a schematic diagram of an organization of data storage space within an NVM device partitioned for separate storage of frequently updated data, in accordance with an embodiment of the invention.

As shown in FIG. 6, two sets of compressed data have been written to two regions of partitioned NVM data storage space 21: to data block 24a and to data block 24b. In addition to space that is available for storing compressed data (including data blocks 24a and 24b, and free space 26), partitioned NVM data storage space 21 may include frequently updated data subspace 28. For example, a location (e.g. address, or offset and size) of frequently updated data subspace 28 may be designated by content in one or more fields of NVM header 22. Frequently updated data may be stored in uncompressed form on frequently updated data subspace 28.

For example, data block 24b may be designated by a field in NVM header 22 as containing currently valid data in compressed form. In addition, frequently updated data subspace 28 may include frequently updated data that is also currently valid. Thus, when retrieving currently valid data from partitioned NVM data storage space 21, data from data block 24b may be read, while, concurrently, data from frequently updated data subspace 28 may be read. Typically, if both data block 24b and frequently updated data subspace 28 include different values for a quantity (e.g. a variable or a field), the value stored in frequently updated data subspace 28 may be preferred as being the more recently stored value. Thus, uncompressed data may be stored to frequently updated data subspace 28 a plurality of times between storing compressed data to partitioned NVM data storage space 21.

When storing current data to partitioned NVM data storage space 21, a method may be implemented in which frequently updated data is identified and separated from the remainder of the current data.

Figure 7:
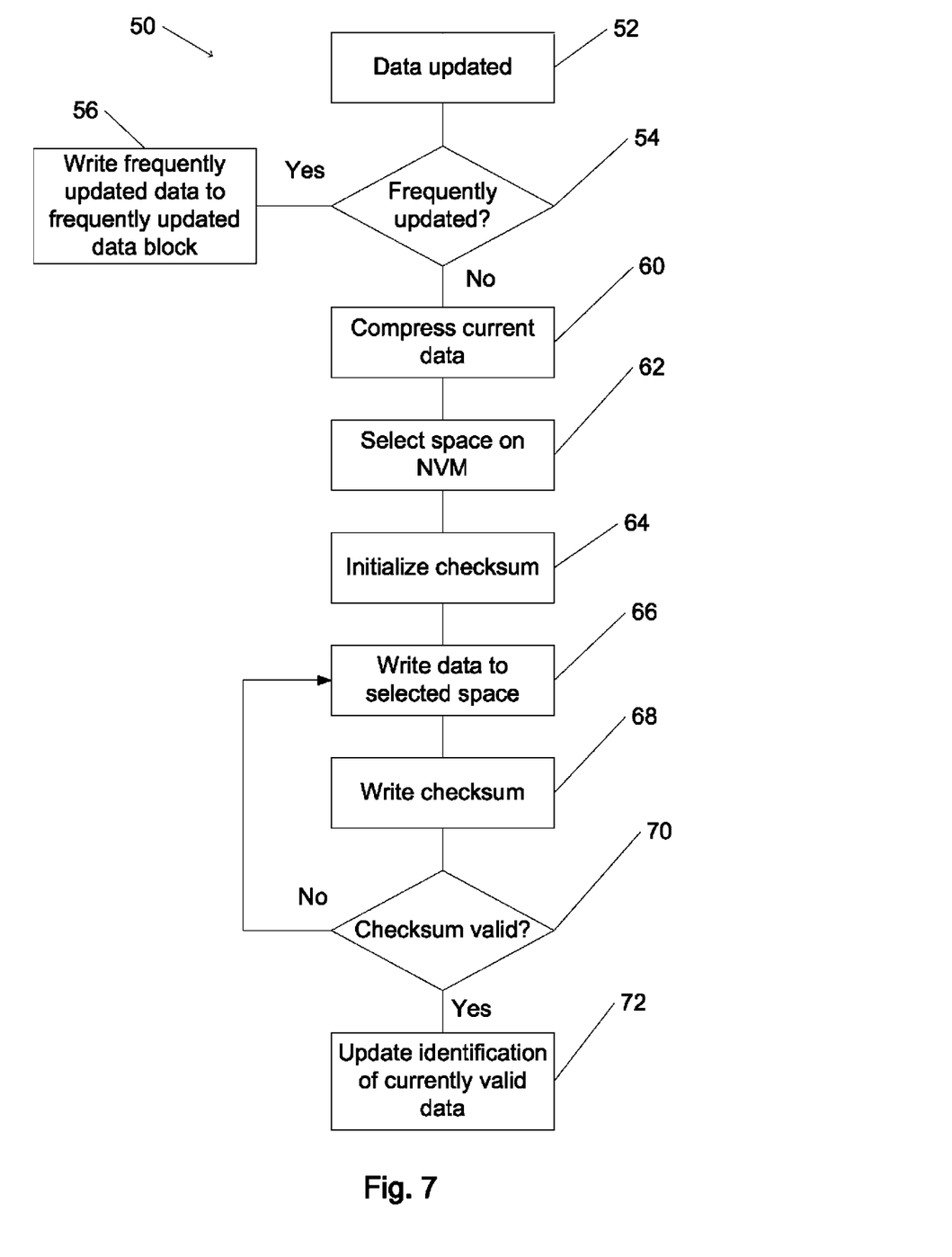
FIG. 7 is a flowchart illustrating a modification of the method for storing data to a partitioned NVM, in accordance with an embodiment of the invention.

FIG. 7 is a flowchart illustrating a modification of the method for storing data to a partitioned NVM, in accordance with an embodiment of the invention. Some steps and elements of partitioned NVM data storage method 50 are similar to previously described corresponding steps of NVM data storage method 30 (FIG. 5), and are therefore described briefly.

Partitioned NVM data storage method 50 may be executed by a processor that is associated with a host device. For example, NVM data storage method 50 may be executed when the processor, during the course of its operation, updates data that is to be stored in a nonvolatile manner for access after, e.g. powering down and then powering up (step 52).

The updated data may be evaluated in accordance with predetermined criteria in order to determine whether or not the updated data includes frequently updated data (step 54). For example, a variable may have been previously designated by a programmer or operator of the host device as a frequently updated variable on the basis of an intended use of the host device. As another example, a processor of the host device may be configured to identify frequently updated variables on the basis of a history of use of the host device. For example, frequently updated data may include data that is modified more often than a predetermined threshold frequency.

If the updated data includes frequently updated data, the frequently updated data may be written to the frequently updated data subspace 28 (step 56). In this case, only data that has been updated (e.g. a variable with a modified—or newly assigned—value) may be written to the frequently updated data subspace 28.

Remaining data that is not frequently updated (typically including all persistent data, whether or not updated) may be stored in compressed form in a manner similar to NVM data storage method 30. In another embodiment, the data that is compressed may also include a current value of the frequently updated data. Thus, the frequently updated data may be initially stored twice. Typically, however, the frequently updated data may be updated and stored to the frequently updated data subspace. In this case, when the stored data is read, the more recently updated data (e.g. more recent value of a variable) that is stored uncompressed in the frequently updated data block may be used instead of the data that is extracted from the compressed data.

The remaining data may be compressed (step 60). A storage space on the NVM device to which the compressed remaining data is to be written may be selected (step 62).

In accordance with an embodiment of the invention, prior to, or concurrent with, writing the compressed updated data to the selected space, a checksum value (e.g. in a field of an NVM header) may be initialized (step 64). For example, the checksum value may be initialized to zero.

The compressed remaining data may then be written to the selected space (step 66).

When the write operation is complete, a checksum value may be calculated and written (step 68). For example, the checksum may be written to a data field of an NVM header. In another embodiment of the invention, the checksum may have calculated concurrently with the write operation.

The written checksum value may then be examined to determine whether the written checksum value is valid (step 70). For example, a checksum value that is equal to the initialized value may be indicative of a failed write operation. As another example, a written checksum value that is inconsistent with the written compressed remaining data may be indicative of a failed write operation. In accordance with other embodiments of the invention, another indicator of a successful write operation may be examined.

If the written checksum value is not valid, the checksum value may be reinitialized and the write operation may be repeated (returning to step 64).

If the compressed updated data was written successfully to the selected space (e.g. as indicated by a valid written checksum value), an identification of a selected space as containing currently valid data may be updated (step 72).

When data is to be accessed, current revision number field, or similar data field, may be read. One or more values that are read from the data field may identify the selected space as containing currently valid data. The data may be accessed by reading the data in the identified selected space and by decompressing the read data. In addition, uncompressed data may be read from the frequently updated data block. The entire set of read data may then be utilized by a processor as currently valid data.

In accordance with an embodiment of the invention, a computer program application stored in nonvolatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as storing data to an NVM device, in accordance with an embodiment of the invention.

The computer-readable medium may be a non-transitory computer-readable media including all forms and types of memory and all computer-readable media except for a transitory, propagating signal. In one implementation, external memory may be the nonvolatile memory or computer-readable medium.

We claim:

1. A method for data storage in a nonvolatile memory device, the method comprising:
    compressing update data into second compressed update data, the update data representing an updated version of first data, the first data stored in a compressed format as first compressed data in a first space of the nonvolatile memory device, and the first compressed data indicated as a valid version by identification data stored in a header in the nonvolatile memory device;
    writing the second compressed update data to a second space of the nonvolatile memory device that does not include a most recently written data; and
    only when the second compressed update data is successfully written, updating the identification data in the header to identify the second compressed update data in the second space as the valid version.

2. The method of claim 1, wherein writing the second compressed update data comprises calculating a checksum, and wherein successful writing of the second compressed update data is indicated by a valid value of the checksum.

3. The method of claim 1, wherein a field of the header stores the corresponding identification data, the header being stored in a dedicated space of the nonvolatile memory device, the header to identify currently valid versions of data stored in the nonvolatile memory device.

4. The method of claim 1, further comprising, prior to compressing the update data, (1) identifying frequently updated data from among the update data, (2) extracting the frequently updated data from the update data, and (3) writing the identified frequently updated data in uncompressed form to a frequently updated data block of the nonvolatile memory device.

5. The method of claim 1, further comprising:
    when the second compressed update data is not successfully written, repeating the writing of the second compressed update data, and
    when the second compressed update data is successfully written after repeating the writing, updating the identification data.

6. The method of claim 1, further comprising:
    determining a first size of free space in the nonvolatile memory device; and
    when a second size of the compressed update data is greater than the first size of the free space, overwriting previously stored data in the non-volatile memory device, wherein the previously stored data does not include the most recently stored data.

7. The method of claim 1, wherein the most recently written data comprises the first compressed data.

8. A non-transitory computer readable medium comprising instructions that, when executed, cause a machine to at least:
    compress update data into second compressed update data, the update data representing an updated version of first data, the first data stored in a compressed format as first compressed data in a first space of the nonvolatile memory device, and the first compressed data indicated as a valid version by identification data stored in a header in the nonvolatile memory device;
    write the second compressed update data to a second space of the nonvolatile memory device that does not include most recently written data; and
    only when the second compressed update data is successfully written, update the identification data in the header to identify the second compressed update data in the second space as the valid version.

9. The non-transitory computer readable medium of claim 8, wherein the instructions, when executed, cause the machine to calculate a checksum, wherein a valid value of the checksum indicates a successful writing of the second compressed update data.

10. The non-transitory computer readable medium of claim 8, wherein the instructions, when executed, cause the machine to update the header in a dedicated space of the nonvolatile memory device.

11. The non-transitory computer readable medium of claim 8, wherein the instructions, when executed, further cause the machine to identify frequently updated data from among the update data, and write the identified frequently updated data in uncompressed form to a frequently updated data block of the nonvolatile memory device.

12. The non-transitory computer readable medium of claim 8, wherein when the second compressed update data is not successfully written, the instructions further cause the machine to repeat the writing of the second compressed update data and, when the second compressed update data is successfully written after repeating the writing, update the identification data to identify that the second compressed update data in the second space is the valid version.

13. The non-transitory computer readable medium of claim 8, wherein the second space of the nonvolatile memory device does not include the first compressed data.

14. A system comprising a processor and a nonvolatile memory device the processor to execute instructions to at least:
    compress update data into second compressed update data, the update data representing an updated version of first data, the first data stored in a compressed format as first compressed data in a first space of the nonvolatile memory device, and the first compressed data identified as a valid version by identification data stored in a header in the nonvolatile memory device;
    write the second compressed update data to a second space of the nonvolatile memory device that does not include a most recently written data; and
    only when the second compressed update data is successfully written, update the identification data in the header to identify that the second compressed update data in the second space is the valid version.

15. The system of claim 14, wherein the system is a component of at least one of a calculator, a PC motherboard, a cellular telephone, a printer, an all-in-one printer, a tablet computer, an e-reader, a router, and a network switch.

16. The system of claim 14, wherein the nonvolatile memory device comprises a data subspace designated for storing the header.

17. The system of claim 14, wherein the nonvolatile memory device comprises a data subspace designated for storing uncompressed data.

18. The system of claim 14, further comprising a random access memory on which the processor stores the compressed update data in response to a request for the valid version.

19. The system of claim 14, wherein the second space of the nonvolatile memory device does not include the first compressed data.

\* \* \* \* \*

UNITED STATES PATENT AND TRADEMARK OFFICE
CERTIFICATE OF CORRECTION

| | | |
|---|---|---|
| PATENT NO. | : 8,656,091 B2 | Page 1 of 1 |
| APPLICATION NO. | : 13/190122 | |
| DATED | : February 18, 2014 | |
| INVENTOR(S) | : Adam J Snyder et al. | |

It is certified that error appears in the above-identified patent and that said Letters Patent is hereby corrected as shown below:

In the Claims:

In column 13, line 2, in Claim 15, delete "one_of" and insert -- one of --, therefor.

Signed and Sealed this
Ninth Day of September, 2014

Michelle K. Lee
*Deputy Director of the United States Patent and Trademark Office*